United States Patent
Ishizaki et al.

(10) Patent No.: US 11,226,220 B2
(45) Date of Patent: Jan. 18, 2022

(54) ULTRASONIC TRANSCEIVER

(71) Applicant: Panasonic Intellectual Property Management Co., Ltd., Osaka (JP)

(72) Inventors: Yudai Ishizaki, Nara (JP); Hidetomo Nagahara, Kyoto (JP); Masanobu Teraji, Nara (JP); Masato Satou, Nara (JP); Yuuji Nakabayashi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 136 days.

(21) Appl. No.: 16/500,391

(22) PCT Filed: Apr. 9, 2018

(86) PCT No.: PCT/JP2018/014876
§ 371 (c)(1),
(2) Date: Oct. 2, 2019

(87) PCT Pub. No.: WO2018/193892
PCT Pub. Date: Oct. 25, 2018

(65) Prior Publication Data
US 2020/0088557 A1    Mar. 19, 2020

(30) Foreign Application Priority Data
Apr. 18, 2017    (JP) .............................. JP2017-081813

(51) Int. Cl.
*G01F 1/66*    (2006.01)
*B06B 1/06*    (2006.01)
(Continued)

(52) U.S. Cl.
CPC ............ *G01F 1/662* (2013.01); *B06B 1/0662* (2013.01); *G01N 29/223* (2013.01); *G01N 29/2437* (2013.01)

(58) Field of Classification Search
CPC .... G01N 29/22; G01N 29/222; G01N 29/223; G01N 29/2437; G01F 1/66; G01F 1/662; B06B 1/0662; B06B 1/0659; H04R 17/00
See application file for complete search history.

(56) References Cited

U.S. PATENT DOCUMENTS 6,508,133 B1    1/2003    Adachi et al.
6,604,433 B1    8/2003    Azuma et al.

FOREIGN PATENT DOCUMENTS

JP    5-023331    2/1993
JP    2001-159551    6/2001
(Continued)

OTHER PUBLICATIONS

Extended European Search Report dated Apr. 2, 2020 in corresponding European Patent Application No. 18788096.8.
(Continued)

*Primary Examiner* — Benjamin R Schmitt
(74) *Attorney, Agent, or Firm* — Wenderoth, Lind & Ponack, L.L.P.

(57) ABSTRACT

An ultrasonic transceiver includes: a piezoelectric body including opposing surfaces having a first electrode and a second electrode respectively, piezoelectric body being segmented into a plurality of elements by a groove recessed from a surface having first electrode among the opposing surfaces; conductor electrically connected to first electrode on each of elements. The ultrasonic transceiver further includes reinforcement section provided in a part of second electrode, the part corresponding to a bottom of the groove. With this configuration, a decrease in a strength of piezoelectric body in the bottom of the groove, which is caused by a groove provided in piezoelectric body, can be prevented and occurrence of a crack can be prevented.

3 Claims, 4 Drawing Sheets

(51) Int. Cl.
    *G01N 29/22*    (2006.01)
    *G01N 29/24*    (2006.01)

(56)            References Cited

FOREIGN PATENT DOCUMENTS

| JP | 2003-270013 | 9/2003 |
| JP | 3554336 B | 8/2004 |
| JP | 4269751 | 5/2009 |
| JP | 2009-267688 | 11/2009 |
| JP | 2011-152356 | 8/2011 |

OTHER PUBLICATIONS

International Search Report of PCT application No. PCT/JP2018/014876 dated Jun. 19, 2018.
Communication pursuant to Article 94(3) EPC dated Oct. 14, 2021 for the related European Patent Application No. 18788096.8.

ULTRASONIC TRANSCEIVER

CROSS-REFERENCE TO RELATED APPLICATIONS

This application is a U.S. national stage application of the PCT International Application No. PCT/JP2018/014876 filed on Apr. 9, 2018, which claims the benefit of foreign priority of Japanese patent application No. 2017-081813 filed on Apr. 18, 2017, the contents all of which are incorporated herein by reference.

TECHNICAL FIELD

The present invention relates to an ultrasonic transceiver to be used in a measuring instrument that measures a flow rate, distance, or the like, by using an ultrasonic wave.

BACKGROUND ART

In ultrasonic transceivers of this type, piezoelectric body 102 has been conventionally installed in a space sealed with topped tubular metal case 101 and metal plate 104, as illustrated in FIG. 8. In piezoelectric body 102, one of electrodes is electroconductively joined to an inner surface of a top panel of metal case 101, and electrode wire 105 is connected to another one of the electrodes and is connected to external lead 110 via electrode 107 of insulator 106 provided to penetrate metal plate 104. Matching layer 108 is pasted to an outer surface of the top panel of metal case 101 with an adhesive or the like (see, for example, PTL 1).

Groove 103 is provided in piezoelectric body 102 to divide the piezoelectric body into two elements 102a, 102b, so that vibration in an electrode direction can be made a main mode. Therefore, a small ultrasonic transceiver with high sensitivity and fast response can be achieved.

CITATION LIST

Patent Literature

PTL 1: Japanese Patent No. 3554336

SUMMARY OF THE INVENTION

In a conventional configuration, although element 102a and element 102b are connected at their bottoms, piezoelectric body 102 is the same as being configured by a plurality of independent elements due to groove 103 of piezoelectric body 102 deepened, which improves sensitivity. However, a strength of a part at the bottom of groove 103 decreases, and there is a possibility that crack 109 may occur due to a load by vibration or a stress during handling. If crack 109 occurs, conduction between the elements becomes poor, and there is a problem that part of the divided elements does not function effectively and sensitivity decreases. If crack 109 occurs as illustrated, for example, in FIG. 8, conduction of electrode wire 105 with element 102a is maintained but conduction with element 102b is not maintained, and hence only element 102a vibrates effectively and sensitivity decreases.

The present invention provides an ultrasonic transceiver in which: a decrease in a strength of a bottom of a groove, which is caused by the groove provided in a piezoelectric body, is prevented and occurrence of a crack is prevented; or conduction can be maintained even if a crack occurs.

The ultrasonic transceiver of the present invention includes: a piezoelectric body including opposing surfaces having a first electrode and a second electrode, respectively, the piezoelectric body being segmented into a plurality of elements by a groove recessed from a surface having the first electrode among the opposing surfaces; a conductor electrically connected to the first electrode on each of the plurality of elements; and a reinforcement section provided in a part of the second electrode, the part corresponding to a bottom of the groove.

Thereby, occurrence of a crack in a groove part whose strength is small can be prevented.

The ultrasonic transceiver of the present invention can prevent a decrease in a strength of a bottom of a groove provided in a piezoelectric body, and can prevent occurrence of a crack.

DESCRIPTION OF EMBODIMENTS

Hereinafter, exemplary embodiments of the present invention will be described with reference to the drawings. It is to be noted that these exemplary embodiments are not restrictive of the present invention.

First Exemplary Embodiment

Figure 1:
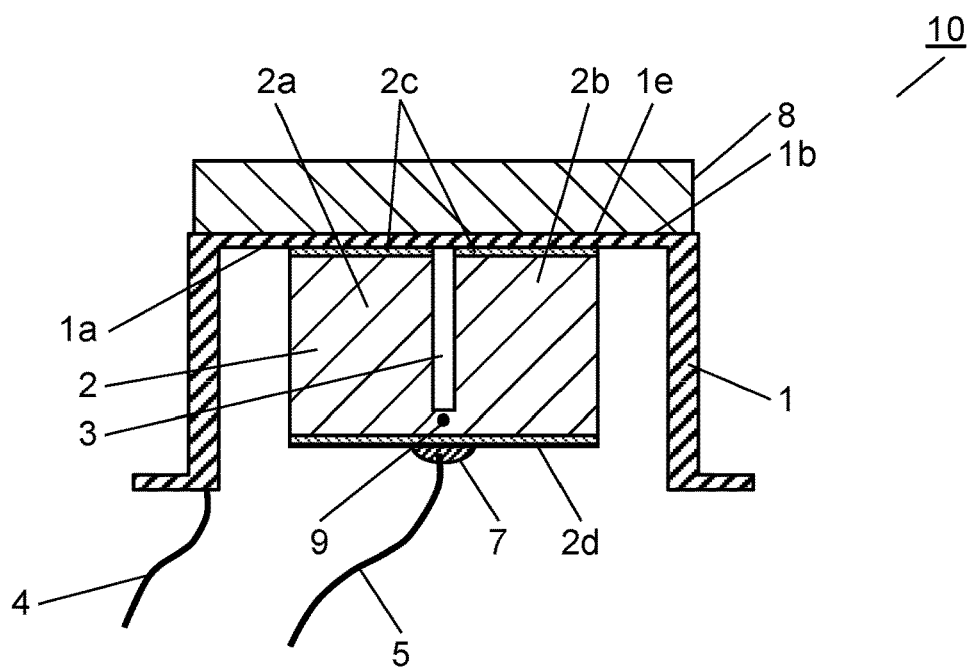
FIG. 1 is a vertical section of an ultrasonic transceiver according to a first exemplary embodiment of the present invention.

FIG. 1 illustrates a vertical section of an ultrasonic transceiver according to a first exemplary embodiment of the present invention.

In FIG. 1, ultrasonic transceiver 10 includes topped tubular metal case 1 (conductor), piezoelectric body 2 having electrode 2c that is a first electrode and electrode 2d that is a second electrode on entire surfaces facing each other, and matching layer 8. In piezoelectric body 2, the surface, on which electrode 2c that is the first electrode is provided, is divided into two elements 2a, 2b by groove 3, and each of elements 2a, 2b is formed to have an optical size and shape for a predetermined vibration frequency. Electrodes 2c of elements 2a, 2b are electroconductively joined to inner surface 1a of top panel 1e of metal case 1. Electrode wire 5 is soldered, at a position of part 9 corresponding to a bottom of groove 3, to electrode 2d that is the second electrode with solder 7, and solder 7 functions as a reinforcement section.

Matching layer 8 is adhered to outer surface 1b of top panel 1e of metal case 1 with an adhesive. Further, lead 4 is joined to metal case 1 to be conductive with electrode 2c of piezoelectric body 2, and piezoelectric body 2 vibrates by a predetermined voltage waveform applied between lead 4 and electrode wire 5, so that an ultrasonic wave is transmitted from matching layer 8 via top panel 1e of metal case 1.

With the above configuration, piezoelectric body 2 can prevent occurrence of a crack or the like in piezoelectric body 2 because solder 7 functions as a reinforcement section, although a strength of part 9 located at the bottom of groove 3 decreases when the groove is provided.

Second Exemplary Embodiment

Figure 2:
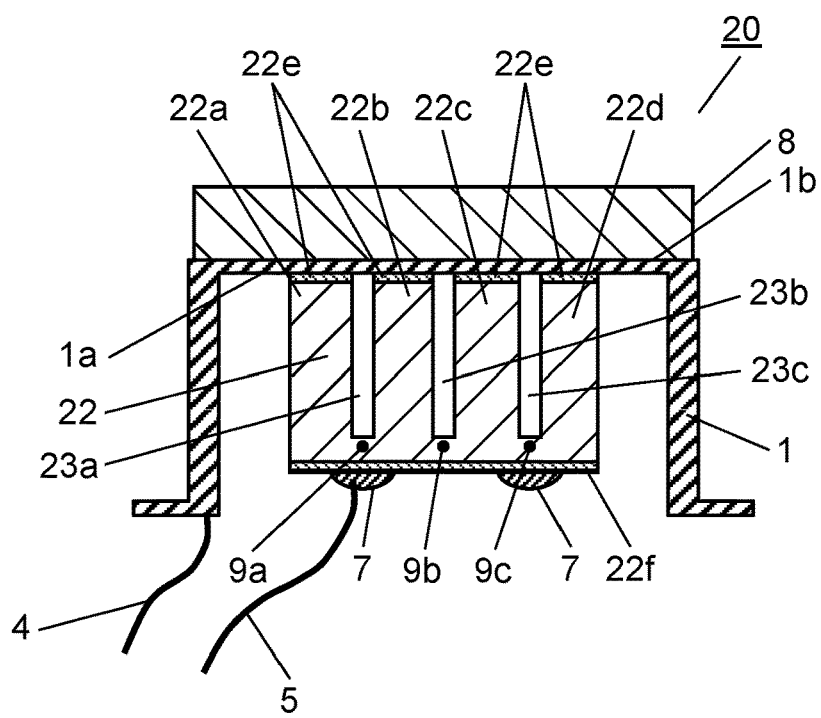
FIG. 2 is a vertical section of an ultrasonic transceiver according to a second exemplary embodiment of the present invention.

FIG. 2 illustrates a vertical section of an ultrasonic transceiver according to a second exemplary embodiment of the present invention. In FIG. 2, the same reference marks as in the first exemplary embodiment have the same structures, and description will be omitted.

In ultrasonic transceiver 20 in the present exemplary embodiment, piezoelectric body 22 is divided into four elements 22a, 22b, 22c, 22d by three grooves 23a, 23b, 23c unlike the first exemplary embodiment. Further, in electrode 22f that is a second electrode, solder 7 is provided at each position of parts 9a, 9c corresponding to the bottoms of groove 23a and groove 23c at both ends of grooves 23a, 23b, 23c. Electrodes 22e that are first electrodes of elements 22a, 22b, 22c, 22d divided by grooves 23a, 23b, 23c are all electroconductively joined to inner surface 1a of top panel 1e of metal case 1.

In piezoelectric body 22, parts 9a, 9b, 9c corresponding to the bottoms of grooves 23a, 23b, 23c are decreased due to grooves 23a, 23b, 23c. Like the first exemplary embodiment, occurrence of a crack or the like can be prevented by providing solder as a reinforcing member on electrode 22f in parts 9a, 9c corresponding to grooves 23a, 23c at both ends that particularly need a strength for vibration. Electrode wire 5 may be connected to solder 7 of either position.

Figure 3:
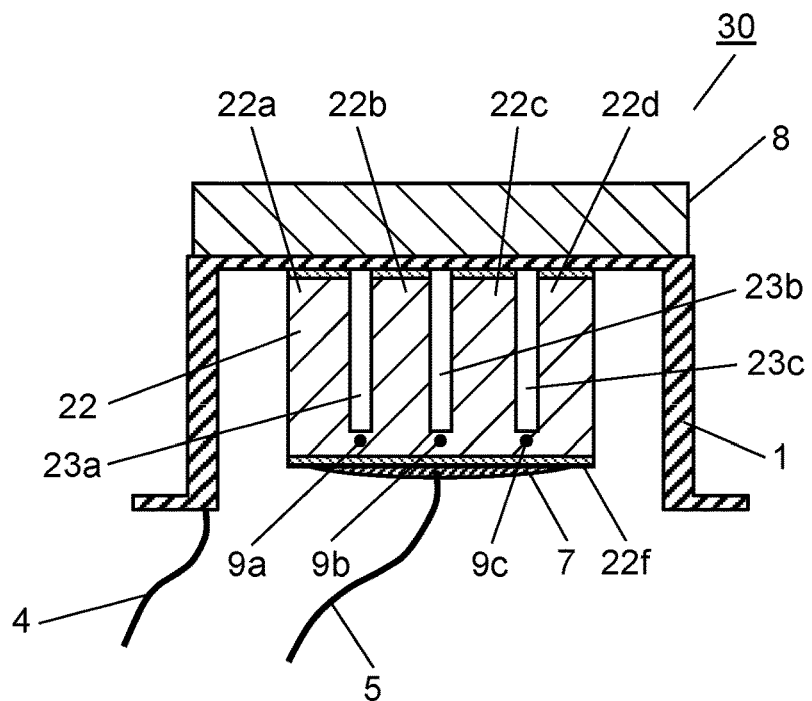
FIG. 3 is a vertical section of an ultrasonic transceiver, illustrating another example of the second exemplary embodiment of the present invention.

In FIG. 2, positions of parts 9a, 9b corresponding to the bottoms of grooves 23a, 23c at both ends are only reinforced with solder 7, but there is no trouble when parts 9a, 9b, 9c corresponding to the bottoms of all grooves 23a, 23b, 23c are reinforced by adding solder 7 also to the position of part 9b corresponding to the bottom of groove 23b at a center. Also, the same effect can be obtained even if the entire positions of parts 9a, 9b, 9c are soldered with one piece of solder 7, like ultrasonic transceiver 30 illustrated in FIG. 3.

Third Exemplary Embodiment

Figure 4:
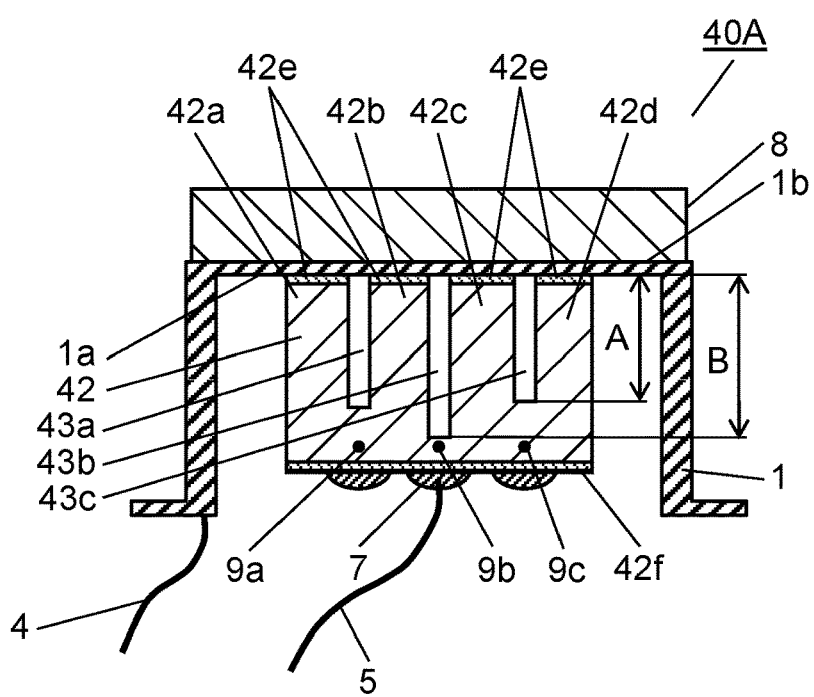
FIG. 4 is a vertical section of an ultrasonic transceiver according to a third exemplary embodiment of the present invention.

FIG. 4 illustrates a vertical section of an ultrasonic transceiver according to a third exemplary embodiment of the present invention. In FIG. 4, the same reference marks as in the second exemplary embodiment have the same structures, and description will be omitted.

Ultrasonic transceiver 40A in the present exemplary embodiment is different from the first exemplary embodiment in that: piezoelectric body 42 of ultrasonic transceiver 40A is divided into four elements 42a, 42b, 42c, 42d by three grooves 43a, 43b, 43c; and depth A of each of grooves 43a, 43c at both ends of the three grooves is made shallower than depth B of groove 43b at a center. Electrode 42e that is a first electrode is electroconductively joined to metal case 1, and electrode wire 5 is connected to electrode 42f that is a second electrode with solder 7.

In piezoelectric body 42, strengths of parts 9a, 9b, 9c, corresponding to the bottoms of grooves decrease due to the grooves. A required strength can be secured by forming a reinforcement section with the depth of each of grooves 43a, 43c at both ends, which particularly need a strength for vibration, made shallow, and hence occurrence of a crack in piezoelectric body 42 can be prevented.

In the present exemplary embodiment, part 9b, corresponding to the bottom of groove 43b whose depth is not made shallow, is reinforced by providing solder 7 at the position of part 9b.

Figure 5:
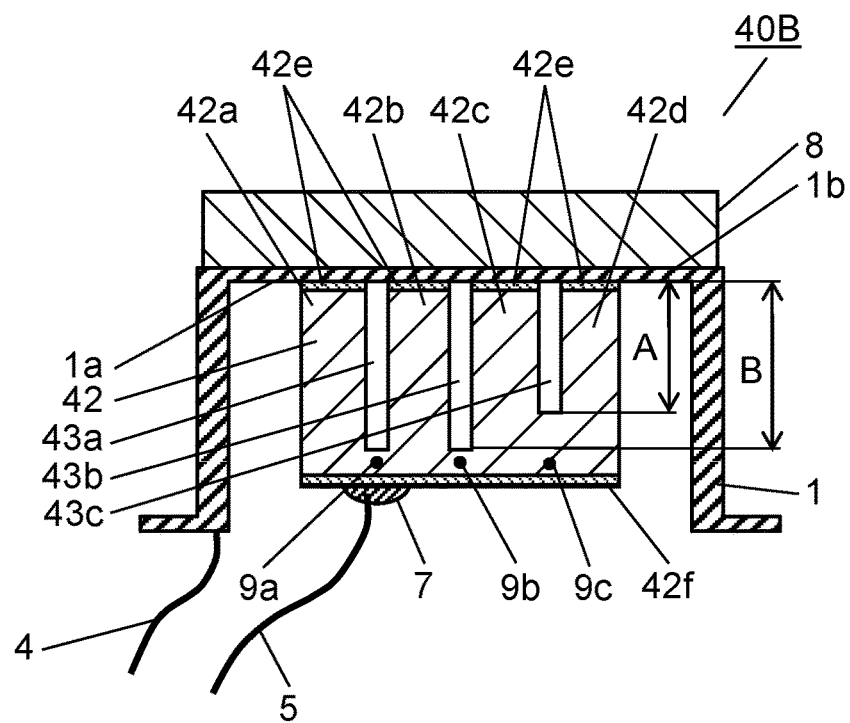
FIG. 5 is a vertical section of an ultrasonic transceiver, illustrating a variation of the third exemplary embodiment of the present invention.

In the present exemplary embodiment, the depth of each of the grooves at both ends in which strengths particularly decrease, is made shallow, but as another example, the depth of groove 43c, one of the grooves at both ends, may be made shallow, and part 9a corresponding to the bottom of groove 43a whose depth is not made shallow may be reinforced with solder 7, like ultrasonic transceiver 40B illustrated in FIG. 5.

Fourth Exemplary Embodiment

Figure 6:
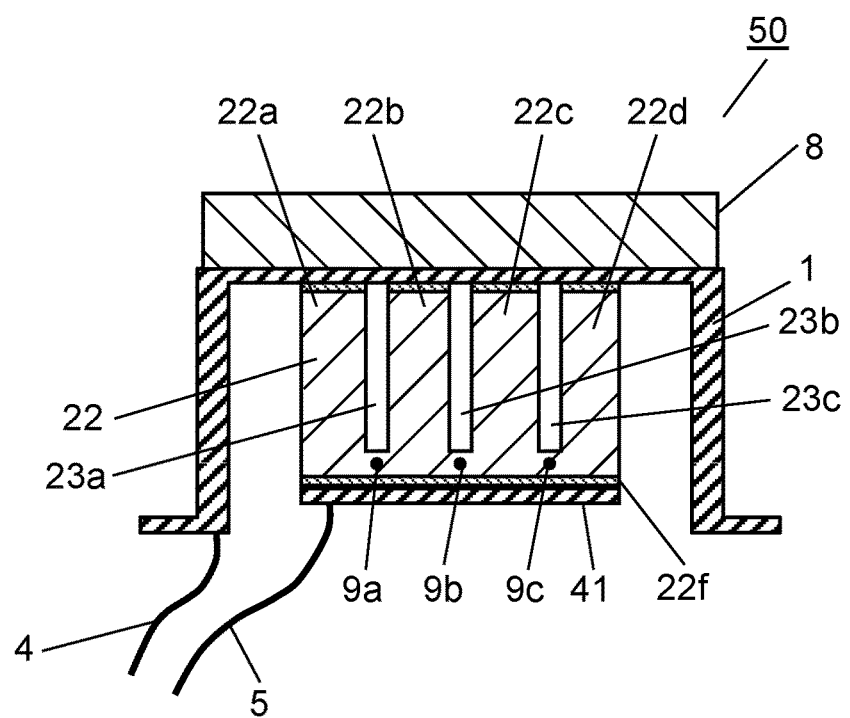
FIG. 6 is a vertical section of an ultrasonic transceiver according to a fourth exemplary embodiment of the present invention.

FIG. 6 illustrates a vertical section of an ultrasonic transceiver according to a fourth exemplary embodiment of the present invention. In FIG. 6, the same reference marks as in the second exemplary embodiment have the same structures, and description will be omitted.

Ultrasonic transceiver 50 in the present exemplary embodiment is different from the second exemplary embodiment in that: reinforcement conductor 41, conductively joined to an entire surface of electrode 22f that is a second electrode, is disposed; and electrode wire 5 is connected to this reinforcement conductor 41.

Therefore, even if a crack occurs in any one of parts 9a, 9b, 9c corresponding to bottoms of grooves, conduction between electrode wire 5 and electrodes of elements 22a, 22b, 22d can be secured by using this reinforcement conductor 41, and failures in which sensitivity decreases and the like can be prevented.

Fifth Exemplary Embodiment

Figure 7:
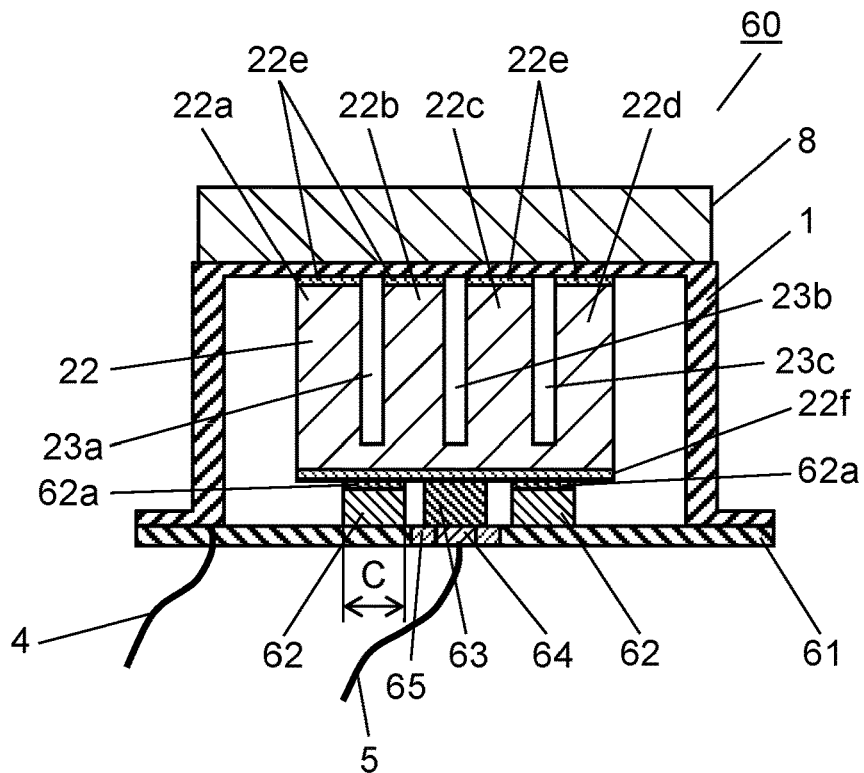
FIG. 7 is a vertical section of an ultrasonic transceiver according to a fifth exemplary embodiment of the present invention.
Figure 8:
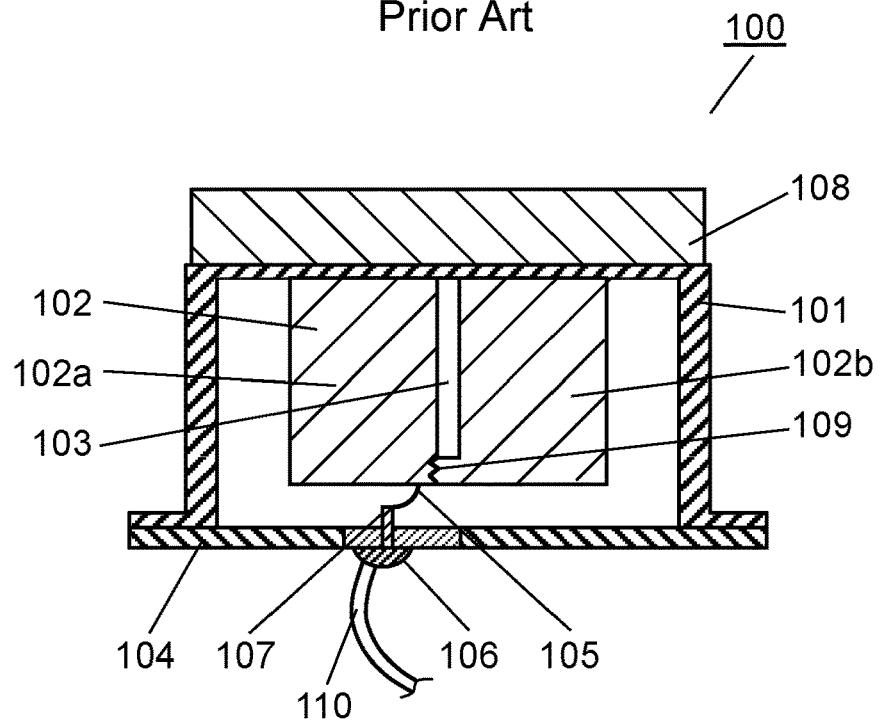
FIG. 8 is a vertical section of a conventional ultrasonic transceiver.

FIG. 7 illustrates a vertical section of an ultrasonic transceiver according to a fifth exemplary embodiment of the present invention. In FIG. 7, the same reference marks as in the second exemplary embodiment have the same structures, and description will be omitted.

Ultrasonic transceiver 60 in the present exemplary embodiment is different from the first exemplary embodiment in that: conductive members 62, 63, each of which has a conductor in a part in contact with electrode 22f of piezoelectric body 22, are disposed at positions of electrode 22f, the positions corresponding to bottoms of three grooves 23a, 23b, 23c of electrode 22f; and conductive members 62, 63 are configured to be pressed against electrode 22f with lid 61 (pressing member) for closing an opening of metal case 1. Conduction between electrodes 22e and lead 4 is secured by: forming lid 61 with a member having conductivity; connecting lead 4 to lid 61; and electrically joining lid 61 to metal case 1.

Herein, conductive member 62 is an elastic body and has a conductor part 62a formed in a part in contact with electrode 22f. Conductive member 63 is an elastic body having electrical conductivity, such as conductive rubber, and conduction between electrode 22f and electrode wire 5 is secured by electrode 22f and electrode wire 5 in contact with conductive part 64 that is connected. Herein, lid 61 and conductive part 64 are insulated by insulating part 65.

Width C of the conductive part in each of the conductive members 62, 63, is set such that even if a crack occurs at the bottoms of grooves 23, conduction among elements 22a, 22b, 23c, 22d, is secured.

With the above configuration, even if a crack occurs in any one of the three grooves, conduction between electrode wire 5 and electrodes of elements 22a, 22b, 23c, 22d can be secured, and failures in which sensitivity decreases and the like can be prevented.

As described above, an ultrasonic transceiver according to a first disclosure includes: a piezoelectric body including opposing surfaces having a first electrode and a second electrode, respectively, the piezoelectric body being segmented into a plurality of elements by a groove recessed from a surface having the first electrode among the opposing surfaces; a conductor electrically connected to the first electrode on each of the plurality of elements. The ultrasonic transceiver further includes a reinforcement section provided in a part of the second electrode, the part corresponding to a bottom of the groove. With this configuration, occurrence of a crack, in a groove part where a strength of the piezoelectric body is small, can be prevented.

In an ultrasonic transceiver according to a second disclosure, a plurality of the grooves each being the groove may be provided, and the reinforcement section may be provided in each of parts corresponding bottoms of at least the grooves at both ends of the plurality of grooves in the first disclosure. When there are a plurality of grooves, strengths of the parts located at the bottoms of the grooves at both ends decrease, but, with this configuration, the parts can be effectively reinforced.

In an ultrasonic transceiver according to a third disclosure, the reinforcement section may be formed with solder, and an electrode wire may be connected to at least one of the reinforcement sections in the first or second disclosure.

In an ultrasonic transceiver according to a fourth disclosure, the reinforcement section may be formed by making a depth of a groove of the plurality of grooves shallower than a groove of the plurality of grooves located inside in the first or second disclosure.

An ultrasonic transceiver according to a fifth disclosure includes: a piezoelectric body including opposing surfaces having a first electrode and a second electrode, respectively, the piezoelectric body being segmented into a plurality of elements by a groove recessed from a surface having the first electrode among the opposing surfaces; a conductor electrically connected to the first electrode on each of the plurality of elements. The ultrasonic transceiver further include a reinforcement conductor electrically joined to an entire surface of the second electrode of the piezoelectric body. With this configuration, even if a crack occurs in a part of the groove of the piezoelectric body, conduction with all of the elements can be secured.

An ultrasonic transceiver according to a sixth disclosure includes: a piezoelectric body including opposing surfaces having a first electrode and a second electrode, respectively, the piezoelectric body being segmented into a plurality of elements by a groove recessed from a surface having the first electrode among the opposing surfaces; a conductor electrically connected to the first electrode on each of the plurality of elements. The ultrasonic transceiver further include: a conductive member provided in a part of the second electrode, the part corresponding to a bottom of the groove; and a pressing member pressing the conductive member against the second electrode. With this configuration, even if a crack occurs in a part of the groove of the piezoelectric body, conduction with all of the elements can be secured.

INDUSTRIAL APPLICABILITY

As described above, the ultrasonic transceiver according to the present invention can provide an ultrasonic transceiver in which: a decrease in a strength of a bottom of a groove, which is caused by the groove provided in a piezoelectric body, is prevented and occurrence of a crack is prevented; or conduction can be maintained even if a crack occurs, and hence durability and reliability can be improved when the ultrasonic transceiver is used in flow rate measuring devices and the like.

REFERENCE MARKS IN THE DRAWINGS

1: metal case (conductor)
2, 22, 42: piezoelectric body
2a, 2b, 22a to 22d, 42a to 42d: element
2c, 2d, 22e, 22f, 42e, 42f: electrode
3, 23a, 23b, 23c, 43a, 43b, 43c: groove
5: electrode wire
7: reinforcement section (solder)
10, 20, 30, 40A, 40B, 50, 60: ultrasonic transceiver
41: reinforcement conductor
61: lid (pressing member)
62, 63: conductive member

The invention claimed is:

1. An ultrasonic transceiver comprising:
a piezoelectric body including opposing surfaces, the opposing surfaces having disposed thereon a first electrode and a second electrode, respectively, and the piezoelectric body being segmented into a plurality of elements by a groove recessed from a surface having the first electrode among the opposing surfaces;
a conductor electrically connected to the first electrode on each of the plurality of elements; and
a reinforcement section provided on a part of the second electrode, the part corresponding to a bottom of the groove,
wherein the reinforcement section is formed with solder, and an electrode wire is connected to the reinforcement section.

2. The ultrasonic transceiver according to claim 1, wherein a plurality of the grooves each being the groove are provided and the reinforcement section is provided in each of parts corresponding to bottoms of at least grooves at both ends of the plurality of grooves.

3. The ultrasonic transceiver according to claim 2, wherein the reinforcement section is additionally formed by making a depth of a groove of the plurality of grooves shallower than a groove of the plurality of grooves located inside.

* * * * *